United States Patent [19]
Robinson

[11] Patent Number: 4,743,287
[45] Date of Patent: May 10, 1988

[54] FERTILIZER AND METHOD

[76] Inventor: Elmo C. Robinson, P.O. Box 27, Paragonah, Utah 84760

[21] Appl. No.: 897,798

[22] Filed: Aug. 19, 1986

Related U.S. Application Data

[63] Continuation-in-part of Ser. No. 653,542, Sep. 24, 1984, abandoned, Continuation-in-part of Ser. No. 428,102, Sep. 29, 1982, abandoned.

[51] Int. Cl.$^4$ .............................................. C05F 13/00
[52] U.S. Cl. ............................................ 71/12; 71/13; 71/15; 71/21; 71/23; 71/24; 71/25; 71/901
[58] Field of Search .................................. 71/1, 11–13, 71/23, 25, 28, 901, 15, 21, 24

[56] References Cited

U.S. PATENT DOCUMENTS 3,929,446 12/1975 Trocino ................................... 71/28
3,942,920 3/1976 O'Donnell ............................... 71/28
3,966,450 6/1976 O'Neill et al. ........................ 71/11 X

*Primary Examiner*—Ferris H. Lander
*Attorney, Agent, or Firm*—M. Reid Russell

[57] ABSTRACT

The invention relates to a novel fertilizer and method wherein a complex humic acid fertilizer is formed a mix of a select organic material, water, and measured amounts of major inorganic elements of nitrogen, phosphate, potash and sulfur. The constituents mixed in a sealed reactor system with a first material, usually an acid, are hydrolyzed by a drastic pH change, raising the mix temperature and pressure, and the mix is subsequently blended with a second material of an opposite pH to the first material, usually a base, reacting with the mix to provide a further temperature and pressure increase, to alter the pH to that of the finished fertilizer, which humic acid fertilizer is then dried and granulated or liquefied to a pumpable slurry.

7 Claims, 1 Drawing Sheet

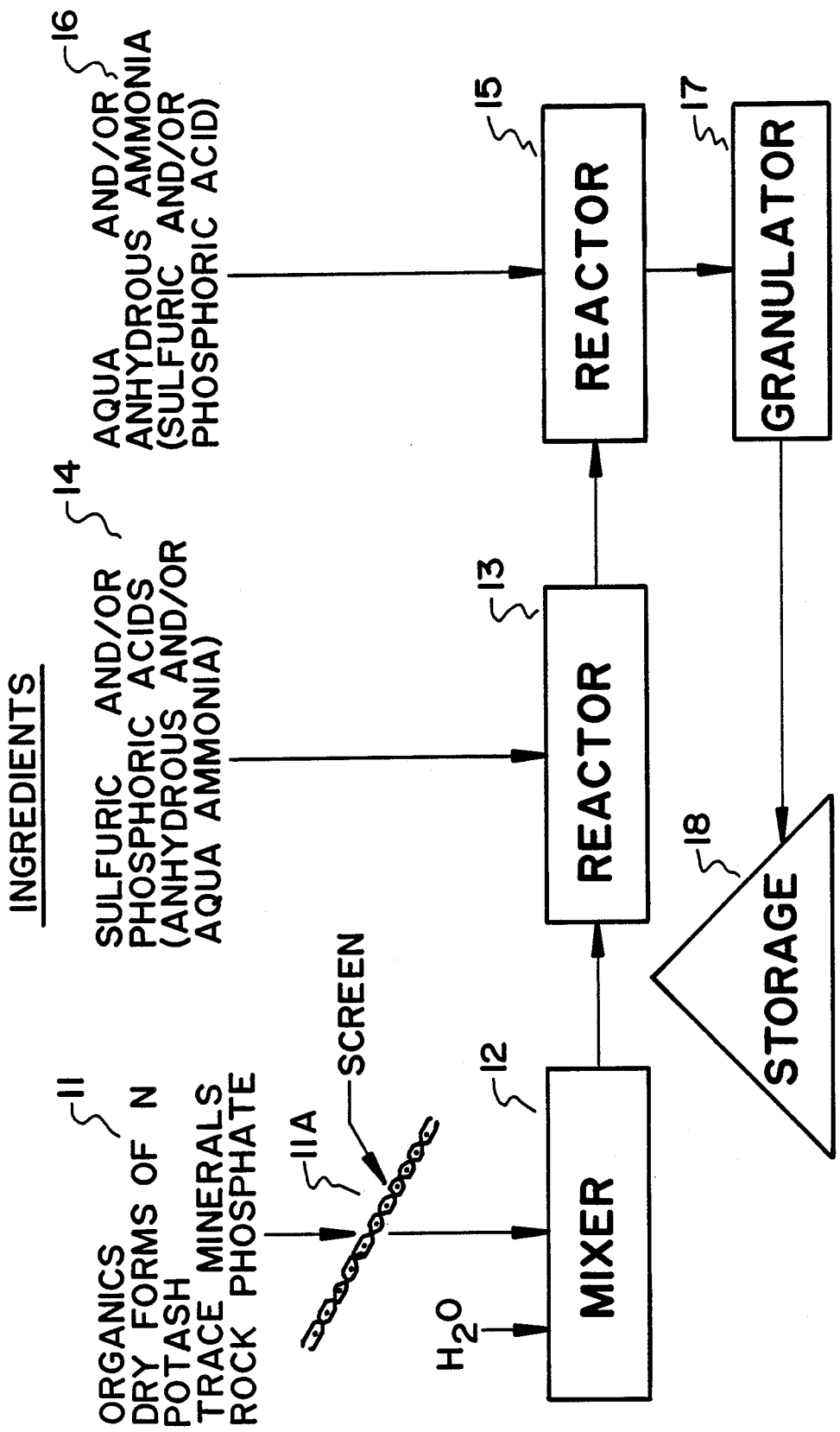

FERTILIZER AND METHOD

This application is a continuation-in-part application of my earlier patent application Ser. No. 06/653,542, filed Sept. 24, 1984, that was a continuation-in-part application of my earlier patent application Ser. No. 06/428,102, filed Sept. 29, 1982 for a "Fertilizer and Method" both now abandoned.

BACKGROUND OF THE INVENTION

1. Field of the Invention

This invention relates to a fertilizer and method, and more particularly, to a fertilizer and method of reacting various types of organic material with certain soluble salt forms of chemical fertilizers to produce a humic acid based fertilizer formulated for specific plant and soil requirements and tailored to have both slow and rapid release characteristics to fit specific plant feeding requirements.

2. Prior Art

Waste organic materials are organic materials discarded as waste from various sources including agriculture, agroindustrial processing as well as manures from animals and humans. Organic materials until approximately the turn of the century were used extensively as a primary nitrogen source for fertilizers. Today, however, such material represents a small fraction of the total fertilizer market, as most organic wastes are low in nitrogen as compared to chemical fertilizers, are difficult to process and handle, and may involve disagreeable odor problems.

It is well known that plant growth depends on a relatively shallow layer of top soil. It is also well known that an organic fertilizer material, or humus, will enhance the retention and storage of water in this layer of soil, and, in addition, will improve soil texture. Importantly, humus creates a soft, friable soil which allows penetration of air and water into the root zone of plants therein and will also support large populations of beneficial soil organisms. Where plant production is to some degree dependent upon a soft friable soil that is obtained through the incorporation of organic material therein, they also require inorganic mineral nutrients for suitable growth. These mineral nutrients are removed from the soil both by crop production as well as through leaching and erosion. Therefore, to provide desirable chemicals to a humic acid fertilizer has required a mixing of the organic materials with an inorganic fertilizer. This has been largely unsatisfactory due to the difficulties inherent in providing an effective molecular bonding of the organic materials with inorganic chemicals mixed therewith, costs and handling difficulties and so, to a large extent, regardless of their benefits, organic based fertilizers are generally not used commercially.

In view of the foregoing, it would, therefore be a significant advancement in the art to provide a fertilizer and method for producing a fertilizer from an available organic material, that, after analysis of the makeup thereof can be combined with select inorganic minerals and other plant nutrients, as required, in a form to produce a humic acid based fertilizer that has a desired nutrient makeup for a specific crop need and/or soil makeup. It would also be an advancement in the art to provide a fertilizer and method whereby large dumps of waste organic material can be suitably utilized in combination with inorganic chemicals and plant nutrients to provide a fertilizer that is easily handled, relatively order free, can be granulated or used as a liquid slurry, and is readily suitable for numerous applications, both for large scale agriculture and individual use by a homeowner. Such a novel fertilizer and process is disclosed and claimed herein.

Combining a treated organic waste with inorganic minerals to form a useful fertilizer is, of course, not new and an example of such application is shown in a patent by Wilson, U.S. Pat. No. 3,050,383. Like the present process, this treatment involves mixing of both an acid and base with an organic material sufficient to produce a granular product. However, the acid and base are simultaneously mixed together with the organic material in this process and therefore will not produce a hydrolysis of the mix or a desirable molecular interaction. Whereas the present process calls first for an introduction and mixing of the organic material with either an acid or base, dependent upon the organic material makeup, and thereafter introducing an opposite material, either a base or an acid, and mixing the materials together, which steps are practiced in a closed vessel. Further, unique from the Wilson patent, the present process to produce a desired end fertilizer makeup provides for first analyzing the organic material to determine its inorganic chemical makeup and then selecting appropriately the particular acid and base and additive inorganic chemicals so as to produce a fertilizer suitable for use with a particular crop and/or a soil makeup.

Earlier processes for combining different organic wastes with inorganic elements may include a pH adjustment of the mix to provide a usable fertilizer are shown in patents by: O'Neill, et al., U.S. Pat. No. 3,966,450; Trocino, U.S. Pat. No. 3,929,446; and O'Donnell, U.S. Pat. No. 3,942,970. Such processes, however, unlike the present process, are limited to a particular organic waste; do not involve a selection of additives to compliment the chemical makeup of the particular organic waste selected so as to produce a fertilizer having a specific chemical composition and properties that are suitable for a select crop and soil; and do not involve the specific sequential steps involved in producing such a humic acid fertilizer.

BRIEF SUMMARY AND OBJECTS OF THE INVENTION

The present invention relates to a novel fertilizer and method wherein a select waste organic maerial is analyzed to determine the average makeup of certain inorganic chemicals, specifically the major elements: N-P-K-S (Nitrogen-Phosphate-Potash-Sulfur). Additives are combined with the organic material that may include measured quantities of the different major elements as they are determined to be needed based on the organic material analysis and taking into account the inorganic chemicals contributed by an acid, usually a sulfuric or phosphoric acid, and a base, usually an anhydrous or aqua ammonia. These constituents are sequentially mixed to produce either a granular or slurry end product, a humic acid fertilizer that has a desired percentage makeup of the major elements for a specific crop, and with a solvent pH appropriate for use with a certain soil.

In practice, the selected organic material is prepared and mixed with measured amounts of the major elements and other plant nutrients as needed, and the mix placed in a closed vessel. For most organic material, an acid, either sulfuric or phosphoric, is added and mixed therewith to provide hydrolysis of the constituents via a drastic pH change. At this stage the mix temperature will be elevated responsive to the acid reaction, the mix will be under pressure, and will have a mix pH that is usually less than 1.5. This step initiates the breakdown of the organic material to humic acid and formation of molecular clusters of plant nutrients around the humic molecules. Next, a basic solution is introduced into the closed vessel and mixed with the constituents, reacting with the acidic mix to further elevate the temperature and pressure within the vessel, which elevated temperature and pressure completes the reaction and molecular bonding, and raises the mix pH to a less acidic pH, usually from 4 to 7 pH. The selection of which pH is dependent upon the type of soil that the humic acid fertilizer is intended for use in. The finished mix is then processed through a granulator to obtain a desired particle size or is pumped into a storage vessel or pit if a slurry is produced.

Where the select organic material has a high lignin or cellulose content the required hydrolysis can be accomplished by bringing the mix first to a high pH of 13 to 14. In this case, preferably aqua or anhydrous ammonia is first mixed with the organic and inorganic materials in a closed vessel. The resulting material is thereafter reacted with an acid material that is on the other end of the pH scale, such as sulfuric or phosphoric acid, to achieve the desired final fertilizer pH.

The mixing process can be performed in either a batch or continuous flow system that will hold a pressure of up to 30 psi during mixing. In a batch system a single reactor vessel or chamber can be used with the respective acid and base materials sequentially injected therein. Whereas, in a continuous flow system, a plurality of reactor vessels or chambers must be used since both materials, acid and base, will be injected at the same time in separate vessels.

It is therefore a primary object of this invention to provide a process to produce a humic acid base fertilizer having a chemical makeup and characteristics suitable for a specific crop and from a select organic material.

Another object of this invention is to provide a method for producing a humic acid fertilizer having improved stability and efficiency wherein the fertilizer is based upon soluble salt-based fertilizers and a waste organic material.

Another object of this invention is to provide a fertilizer manufactured by combining waste organic materials, inorganic minerals and nutrients, and a nitrogen base whereby the resulting humic acid fertilizer product will have a desired chemical makeup by weight and a selected pH, and can be either granulated and dried or produced in a liquid slurry form and is then ready for application.

BRIEF DESCRIPTION OF THE DRAWINGS

These and other objects and features of the process of the present invention will become more fully apparent from the following detailed description in which the preferred steps in practicing the invention will be described in detail in conjunction with the accompanying drawings.

FIG. 1 is a block flow schematic illustrating the steps sequentially performed in practicing the process of the present invention to obtain a dried granular material in a continuous flow production unit.

DETAILED DESCRIPTION OF THE PREFERRED EMBODIMENTS

General Discussion

The novel fertilizer and method of this invention involves a unique procedure for reacting waste organic materials and inorganic chemicals to form humic acid based fertilizers. Humic acids are defined as any of various organic acids obtained from humus, a brown or black complex variable material resulting from partial decomposition over time of plant or animal matter and forming the organic portion of soil. The process of forming humus naturally involves the breakdown of composted, digested, or mechanically comminuted animal or plant wastes and forming humic acids therein. In such natural process various available plant nutrients are attached to the humic acid molecules to form complex molecular clusters of humic acids and humic acid salts of plant nutrients. Advantageously, the resulting fertilizer will be much more stable and efficient as a fertilizer than in any other form but, of course, takes a long period of time to be naturally produced. The process of the method of this invention can accomplish in a few minutes what would happen in an ideal situation in a high humus, fertile soil if some of the soluble salt forms of nutrients were added in small amounts over a long period of time and where the soil temperature, moisture and oxygen supply could all be suitably controlled, thus producing a highly desirable soil for plant production. Advantageously, the fertilizer produced by the method of this invention is in a form that is completely natural to and is pH balanced to compliment a particular soil, such that the biological systems in that soil will not be adversely effected. Such fertilizer thereby provides a more balanced, slow release of nutrients than would be otherwise available.

A need for this type of fertilizer composition has been recognized and is set out in the patent cited in the Prior Art Section, a U.S. patent by Wilson, U.S. Pat. No. 3,050,383, that discloses a fertilizer and method for producing a fertilizer wherein a low analysis organic waste material is simultaneously mixed with an acid and ammonia and subsequently granulated. The patent teaches simultaneously adding the acid and ammonia solutions to the organic material by spraying them thereover through separate nozzles so as to uniformly wet the solid material. The present invention, distinct therefrom, is illustrated by a block flow schematic of FIG. 1. After the chemical makeup of a selected organic material, either solid or liquid, is determined, it is combined with measured quantities of inorganic elements and other plant nutrients, as shown at 11, which additives are calculated to produce an end fertilizer that has a desired chemical makeup for a type of crop and soil and also taking into account the nutrient content of an acid and base used in the process. Next, as illustrated at 12, a measured amount of water is introduced to the mix unless otherwise available from moisture materials in the mix and thereafter the mix that does not contain a significant amount of humic acid is installed in a sealed reactor vessel 13, that is shown as a first reactor. Thereafter and dependent upon the physical makeup of the selected organic material, as will be discussed later herein, a measured amount of either an acid or a base, illustrated at 14, is next added to and mixed with the combined organic matter and inorganic elements, that produces a chemical reaction that elevates the temperature and pressure within that closed reactor vessel. The organic material is thereby hydrolyzed via the drastic pH change to create humic acids with the added inorganic salt chemicals forming molecular clusters around the humic acid molecules. The mixing takes place over a period of time that is dependent upon speed of mixing to produce a desired pressure and temperature level, as will be illustrated in the examples set out later herein. Thereafter, the material is either transferred to a second reactor 15 if the process is being practiced in a continuous flow system, or, if the process is being practiced in the batch system the reactors 15 and 13 are combined into one vessel that is closed during the reaction. Into the closed reactor vessel 15, as shown in FIG. 1, through spray nozzles, or the like, is injected a measured amount of a material 16 that is the pH opposite to that material introduced into reactor 13, and mixed therewith to react with that mix, so as to adjust the final pH of that mix to one selected for a particular soil and crop that the fertilizer will be used on. In practice, a final pH is usually one selected between 4 and 7 but can be as low as 2. The mixing in reactor 15 further elevates the temperature and pressure therein to further foster the bonding of the humic acid molecules to the added plant nutrients to a point of saturation, with any excess inorganic elements not so bonded remaining as soluble salts in the finished fertilizer to dissolve into the soil.

The reaction that takes place within the mix with the introduction and mixing of the first material 14, the sulfuric and/or phosphoric acid, and thereafter with the introduction and mixing of a second material 16, an aqua and/or anhydrous ammonia, the temperature within the vessel will reach between 110° and 280° F., with a pressure of up to 30 psi in the closed reactor vessel. This temperature and pressure and the chemical reaction that occurs with the first addition of an acid followed by a base, provides a hydrolysis of the mix ingredients forming a completely new molecular structure that includes molecular clusters of inorganic chemicals that surround larger humic acid molecules, which new molecular structure is essentially like that which occurs naturally in highly fertile soils. Optionally, where the selected organic material is one that has a high lignin or cellulose content, it has been found in practice that it is possible to start the hydrolysis process with a drastic pH change to a basic state as by combining the mix with an anhydrous or aqua ammonia, illustrated by the bracket portion of element 14 of FIG. 1, whereafter, a second opposite pH material shown in brackets in element 16 of FIG. 1 as sulfuric and/or phosphoric acid, is mixed therewith to lower the mix pH to the pH level of the desired finished fertilizer. The present process can therefore be practiced by first taking the mix to a high acid or basic level for a drastic pH change that causes a hydrolysis of the organic and inorganic materials at a specific moisture content resulting in that formulation of the desired humic acid fertilizer and then neutralizing the mix to the final fertilizer pH.

Shown in FIG. 1, from the reactor 15, the mix, if it is to processed to a dry fertilizer, is removed from introduction to a granulator 17. In practice, utilizing the preferred mixing times and holding temperatures as set out in the examples herein below, it has been found that for the mix to emerge from the reactor so as to have a desired moisture content suitable for passage to granulator 17, the mixer 12 should receive a measured water input 11a to bring the mix to approximately a 20 percent moisture content by weight, which content can be varied between 12 and 30 percent dependent upon the organic material selected. Thereby, a finished mix, when removed from reactor 15, will have a moisture content that is suitable for passage to granulator 17 wherein the mix is combined into particles of a desired size. With a preferred moisture content, the material can be easily formed into particles and the particles will dry rapidly as therefore conveyed and dropped into a storage pile, illustrated at 18. Also, should a pumpable slurry be desired instead of a dry granular material, then moistures of 50% to 90% by weight, can be used to form a liquid slurry fertilizer.

While the very complex chemical reactions, molecular structures and the formation of the resulting fertilizer that result from the practice of the process of the present invention are not completely understood, it is believed that it is the drastic pH change to the mix of organic and inorganic materials and water that brings about the desired hydrolysis to form humic acid. Whereafter, with the increase in pressure and temperature that occurs in a closed vessel from the initial mixing and subsequent neutralization to a desired mix pH, that mix is cooked to further complete the new molecular structure. The organic elements thereby form molecular clusters surrounding the larger humic acid and humic acid molecules, to produce a humic acid fertilizer that is similar to those found naturally in highly fertile soils.

As set out above, the present process can be practiced on a number of organic materials with an early step in that process being to determine the constituent or component makeup of that organic material. This analysis is then used as the basis for a selection of inorganic elements and the selection of the quantities and strengths of the acid and base for mixing therewith so as to produce a fertilizer that has a certain major element makeup and pH for a specific crop need and soil makeup. In practice, the following listed organic materials have been found to have a makeup of constituents as shown, which organic materials have been used in various amounts to produce a wide range of fertilizer formations:

| Organic Materials | Fertilizers and Plant Nutrients |
| --- | --- |
| Livestock and Poultry Manure | Ammonium Sulfate and Nitrate |
| Sewage Sludge | Ammonium Phosphates |
| Separated Garbage | Anhydrous Ammonia |
| Cotton Gin Trash | Aqua Ammonia |
| Various Cannery Wastes: Grape, Tomato, Fruits, and Nuts | Urea |
| | Rock Phosphate |
| Wood and Paper Pulp Wastes | Triple and Super Phosphates |
| Spent Mushroom Compost | Phosphoric Acid |
| Methane and Alcohol | Sulfuric Acid |
| Solid Wastes | Elemental Sulfur |
| Lignite, Leonardite, Humates, Coals, etc. | Potassium Chloride and Sulfate |
| | Various Trace Minerals: Fe, Zn, Mg, B, Cu, etc. |

With the selected organic material that does not contain a significant amount of humic acid, as set out above, to produce a desired end fertilizer requires that the relative percentages of constituents thereof that are commonly known as the fertilizer major elements N-P-K-S (Nitrogen-Phosphate-Potash-Sulfur) be taken into account along with the quantities of the major elements contributed by the selected acid and base in determining the amounts of these major elements to be added to the mix to produce the desired finished fertilizer. In practice, to the select inorganic material whose chemical makeup is known, amounts of major elements are added to the mix to where individual element requirements of nitrogen, phosphate, potash or sulfur, in percent (%) increments by weight, are met. Each percent (%) being the actual amount of the element as is standard in the fertilizer industry, for example ten percent (10%) of nitrogen indicates ten pounds of nitrogen in each 100 pounds of fertilizer, and providing that the total combination of the four elements shall not exceed thirty-two percent (32%).

Prior to mixing of the inorganic elements with the select organic materials, the organic materials will have been preconditioned as necessary by composting, digestion, mechanical grinding or screening so as to obtain a particle size of one-fourth inch (¼) or less. In dry granular production, in most cases, the organic material will need to be at least thirty percent (30%) by dry weight of the finished product in order to produce enough humic acid molecules to bond to the added inorganic elements or plant nutrients. In practice, it has been found that if the amount of organic material is not adequate or the plant nutrient materials are formulated too high, the excess will create regular soluble salt forms of fertilizer as there will not be enough available humic acid molecules for the inorganic salts to bond with the molecular clusters. At this point, trace mineral elements can be added in small amounts to one percent (1%) or less of the mix to fulfill specific needs as required. This mix, as set out above in reference to mixer 12, can receive water as an additive so as to bring the moisture content thereof to approximately twenty percent (20%) by weight though the content can be varied between twelve and thirty percent (12% and 30%) depending upon the granular particular size required for the end product and the type of organic materials selected. Where the process is practiced on liquid slurries, the organic material that also does not contain a significant amount of humic acid will usually be formulated at ten to twenty five percent (10% to 25%) by weight of the finished product. Also, for a slurry end product, the chemical elements will also be formulated at a lower percentage.

As set out above, for most organic materials it has been found in practice that the requisite hydrolysis can be accomplished by first an introduction of an acid, other than humic acid, to the mix, with the preferred acids shown at 14 as sulphuric and/or phosphoric acid, to drip the pH thereof to less than 1.5, and usually in the range of 1.5 to 0.2. After mixing and the resulting described rise in temperature and pressure, a base such as anhydrous and/or aqua ammonia is added thereto to raise the pH back to above 2, generally in the area 6.5, which pH is selected for use with the particular crops and soil wherein the fertilizer is used. The usual procedure is therefore treatment with an acid followed by a base. This is generally the case except where the selected organic material is found to have a high lignin or cellulose content, with which organic material it has been found that hydrolysis can also be accomplished by initially introducing a basic material thereto to create a high pH of 13 to 14, and a preferred basic material is illustrated by the bracketed anhydrous and/or aqua ammonia, shown at 14, which treatment is followed by an acid treatment, illustrated by the bracketed sulfuric and/or phosphoric acid, shown at 16, that are, respectively, options for use in this variation. The acid-ammonia ratios will be varied to accommodate the particular makeup of the organic material selected and must be determined by actual reaction tests to be accurate. In practice, however, it is usually the case that around three parts (by weight) of one of the acids to one part of anhydrous ammonia is required to obtain a fertilizer having a pH of 7 (Neutral). In practice, a measured amount of the sulphuric and/or phosphoric acids must be used that is sufficient to initially drop the pH of the mix to 1.5 or less, which amount is usually from fifteen to thirty percent (15% to 30%) by weight of the finished product for granular products and from five to fifteen percent (5% to 15%) for a slurry. The aqua and/or anhydrous ammonia added thereafter must likewise be in a sufficient amount to raise the pH of the acidified mixture to that desired as the finished fertilizer pH, which added ammonia will also provide an amount of nitrogen to the compound. Obviously, therefore, the nitrogen present in the organic matter and the inorganic elemental forms of nutrients must be taken into account, and be balanced against the nitrogen provided by the ammonias introduced later in the process. Where it is desired to maintain an end fertilizer pH at a low level with a high nitrogen content formulation, other forms of nitrogen can be provided that will not raise the pH, such as urea, and, in practice, the ammonias were usually approximately four to ten percent (4% to 10%) by dry weight of the finished product for a granular product and from two to eight percent (2% to 8%) in a slurry.

As shown in FIG. 1, the first combining of acid with the organic and inorganic mix takes place in sealed reactor 13, and effects hydrolysis thereof due to a drastic pH change that occurs with the introduction of that acid. FIG. 1 shows the reactor vessels as being separate as would be the case for a continuous flow process, with each vessel capable of being sealed to maintain a 30 psi pressure during blending, adjutating or tumbling of the mixture and during the entire reaction process. In a batch mixing situation, the reactors 13 and 15 would be the same reactor, with the acid and base, respectively, sequentially injected into the sealed reactor. In either reactor arrangement, injection nozzles must be provided such that the ammonia and acids can be sequentially injected during the mixing process. In practice, it has been found that the more intense the mixing the quicker the reaction will take place. As for example, the reaction time can be as short as 5 to 10 seconds with a high speed blender or adjutator, but may require many minutes and even hours in a slow speed tumbler.

Process Illustration

Hereinbelow as illustrated a practice of the process of the present invention using a select organic material to produce an end fertilizer having the major element constituents by weight of 6-8-0-7 (N-P-K-S). With this as the goal or requirement, and the manufacture taking place in the reactor system illustrated in FIG. 1, or the like, the steps involved in forming this fertilizer are as follows:

1. Determine the nutrient element makeup of the organic material and acid and base to be used and supplement these amounts with appropriate quantities of the inorganic elements to meet the above requirements, while staying within the guidelines set out above to achieve a proper reaction.

Available ingredients:
Organics—composted dairy manure with 1.5–1.5–0.5 N-P-K analysis and add: use 44% dry weight
Rock Phosphate;—ground rock with 28% $P_2O_5$—use 27% dry weight;

Sulfuric Acid—use 22%; and
Anhydrous Ammonia—(NH$_3$)—use 7%.

2. Mix the organics an the phosphate together with enough water to bring the mixture to 20% moisture by weight. The moisture content can vary between 12% to 30% to appropriately adjust the granulation particle sizes and for other types of organics. Other dry materials such as potash, trace materials, or nitrogen can also be added here if required.

3. Determine the rate of flow of the pre-mixed solids and adjust the sulfur and nitrogen injections accordingly.
   (a) Pre-mix flow at 12 lbs. (dry weight) per minute
   (b) Set sulfuric acid injection in first reactor chamber at 3.7 lbs/min
   (c) Set NH$_3$ injection in second reactor chamber at 1.2 lbs/min 4. As the pre-mix flows through the system, it is completely mixed with the sulfuric acid in the first chamber. This acidified mixture will reach a temperature of 110° to 200° F., starting the hydrolysis process of the raw materials that thereafter passes through a transfer auger into the second reactor chamber. In the second reactor chamber the NH$_3$ is injected and mixed with the acidified mixture with a temperature elevation in a range between 180° and 280° F., with pressures of up to 30 psi. The temperature, pressure, and chemical reaction completes the hydrolysis of the ingredients forming a completely new molecular structure. The individual elements thereby form molecular clusters around the larger humic and humic acid molecules, which are molecular clusters of plant nutrients similar to those found naturally in highly fertile soils.

In cases where a high or basic pH is used to start hydrolysis, as discussed hereinabove, the ammonia would go into the first reactor and the acids into the second.

5. The reacted mixture of this illustration is now a completed fertilizer and is finished by processing through a granulator to obtain the desired particle size. The moist material forms easily into granules at this point and due to the high temperatures will dry itself very rapidly as it is conveyed and dropped onto a storage pile.

Of course, where the present process is practiced on a slurry, the final fertilizer will still be in slurry form and is appropriately stored in containers or otherwise transferred for spraying onto a field.

Additional to this illustration, the applicant has heretofore practiced the present process to produce both granulated and slurry fertilizers and the following examples further illustrate the novel fertilizer and method of the invention, which disclosure should be understood or be taken as being non-limiting.

EXAMPLE 1

In a first example, to produce a dry granulated fertilizer 14.0 Kg of compost was obtained as a commercially available compost of grape waste from a winery and chicken manure from California Compost Company, Modesto, Calif. The compost had a density of about 18.6 Kg per cubic foot and a moisture content of 16.8% such that the dry weight of the compost was 11.7 Kg. The laboratory analysis of the compost was 2% nitrogen; 2.5% phosphorus pentoxide; 3% potash and it had a pH of 7.3.

A rotatable reactor was specially designed with acid and nitrogen base injection nozzles as well as a pressure monitor and release system. The reactor was cylindrical and its dimensions were about 40 cm long and 61 cm in diameter.

The compost and 4.9 Kg (dry weight) rock phosphate were placed in the drum. Both ingredients were in granular form having a particle size less than 63.5 mm. The reactor was rotated at 19 RPM and 6.8 Kg sulfuric acid was injected through the acid injection nozzle over a time period of about 3 minutes.

Anhydrous ammonia was then injected through the nitrogen base injection nozzle until the pressure in the reactor reached 20 psi. The material was continued to be tumbled for 30 seconds after which carbon dioxide and steam were vented until the pressure within the reactor dropped to 5 psi. The procedure of anhydrous ammonia injection, tumbling, and pressure release was repeated several times until a strong ammonia smell was detected in the released gases. At that time the pressure was released from the reactor and the reactor was opened to check the contents. It was discovered that the material in the reactor was quite dry (6% moisture by weight). The pH was 4.0 and only about 2.4 Kg anhydrous ammonia had been used. The temperature of the material was about 99° C.

It was determined from this experiment that the moisture content (16.8% by weight) was too low and that too much acid had been used. Therefore, a second run was made following the same experimental protocol but with essentially identical quantities of reactants and the addition of 1 Kg water to the compost to bring the moisture content to 25%.

The two runs are set forth in Table I, below:

TABLE I

EFFECT OF INCREASED MOISTURE CONTENT ON GRAPE WINERY WASTE AND CHICKEN MANURE

| Ingredients | Run 1 | | Run 2 | |
| --- | --- | --- | --- | --- |
| | % Dry Weight | Kg in a 25.8 Kg Batch | % Dry Weight | Kg in a 25.8 Kg Batch |
| Compost | 45.26 | 11.7 | 46.5 | 12.0 |
| Rock Phosphate | 19.16 | 4.9 | 19.3 | 5.0 |
| Sulfuric Acid | 26.32 | 6.8 | 25.0 | 6.5 |
| Anhydrous Ammonia | 9.26 | 2.4 | 9.2 | 2.4 |

The fertilizer produced by Run 2 had a pH of 7.0, 10% moisture, by weight, and excellent granulation with no dust and over 85% passed through a ¼ inch (63.5 mm) mesh screen. Laboratory analysis found 52.5% humic acid; 8.32% nitrogen; 6.2% P$_2$O$_5$, with 4.65% soluble; 1.09% K$_2$O, with 0.24% soluble and a density of 25.1 Kg per cubic foot. The formulation was 8-6-1-8 which, according to common practice, is the percentage, by weight, of the elements: nitrogen, phosphorus, potassium, and sulfur, respectively.

EXAMPLE II

A composted cattle and chicken manure was treated according to the novel process of the method of this invention to produce a dry granulated fertilizer and the following formulations (shown as percent of dry weight) were obtained:

TABLE II

| Ingredients | Nutrient Ratios | | |
| --- | --- | --- | --- |
| | 8-8-0-8 | 6-8-0-6- | 7-8-0-7 |
| Compost | 36.5 | 48 | 42.4 |
| Rock Phosphate | 26.7 | 26 | 26.4 |
| Sulfuric Acid | 27.6 | 19.5 | 23.4 |

TABLE II-continued

| Ingredients | Nutrient Ratios | | |
|---|---|---|---|
| | 8-8-0-8 | 6-8-0-6- | 7-8-0-7 |
| Anhydrous Ammonia | 9.2 | 6.5 | 7.8 |

EXAMPLE III

A composted cotton gin waste and chicken manure was treated according to the novel process of the method of this invention to produce a dry granulated fertilizer and the following formulations (shown as percent of dry weight) were obtained:

TABLE III

| Ingredients | Nutrient Ratios | | | | |
|---|---|---|---|---|---|
| | 8-7-1-1 | 8-0-1-5 | 8-6-1-5 | 8-6-1-8 | 4-9-0-7 |
| Compost | 65.9 | 70.5 | 47.5 | 42.4 | 40.1 |
| Rock Phosphate | 0 | 0 | 21.4 | 21.0 | 32.0 |
| Phosphoric Acid | 13.8 | 0 | 0 | 0 | 0 |
| Urea | 8.6 | 8.7 | 8.7 | 0 | 0 |
| Sulfuric Acid | 5.9 | 15.9 | 17.5 | 27.45 | 23.0 |
| Anhydrous Ammonia | 5.7 | 4.9 | 4.9 | 9.15 | 4.9 |

Other runs have been made to produce dry granulated fertilizers using spent mushroom compost resulting in nutrient ratios of 8-0-0-8 and 8-8-0-8; and uncomposted steer manure resulting in nutrient ratios of 8-6-0-8 and 6-8-0-6. Test runs have also been made using composted garbage, sewage sludge, paper pulp sludge and tomato wastes.

Additionally, the process has been practiced on a slurry containing organic material such as sewage waste to produce a fertilizer in slurry form, as follows:

EXAMPLE IV

In this example, a liquid fertilizer was manufactured from a dairy manure slurry utilizing a 50 gallon tank equipped with a mixing adjutator and injection nozzles as the reactor for a 200 lb. batch. The calculated formula was:

| Dairy manure slurry 21% solids | 69.8% |
|---|---|
| Phosphoric acid | 10% |
| Sulfuric acid | 15% |
| NH$_3$ | 6.2% |

For a mix of 5-5-0-5 (N-P-K-S) the slurry was put into the vessel and the acids, first sulfuric acid followed by phosphoric acid were added and mixed to produce a liquid pH of 0.5, raising the temperature of the mix to 130° F. The ammonia was then injected to produce a final pH of 6.8 with a mix temperature of 180° F., and with the slurry mix pressure going to 3 to 5 psi as steam was continually released, this final product could be kept in a pumpable slurry with light adjutation and was easily applied to a field with a sprayer.

EXAMPLE V

The same reactor was used and produced the same size batch. The mix formula was calculated at:

| Sewage sludge at 20% solids | 83.3% |
|---|---|
| Rock Phosphate ground to 200 mesh | 3% |
| Sulfuric acid | 10% |
| NH$_3$ | 3.75 |

The slurry pH was 6.5 at the start and with the acid addition dropped to 0.4. In the process the rock phosphate was first added to the slurry, whereafter sulfuric acid was added that lowered the mix pH to 0.4, the temperature raising from 71° to 110° F. The mix was then cooled to 80° F. in about 10 minutes by circulating cooling water around the outside of the dum. Ammonia was then injected raising the mix pH to 7 and the temperature raised back to 112° F. The drum pressure was allowed to raise only to about 3 lbs. per square inch (psi) by periodically venting the steam produced by the reactions. The nutrients in the slurry and those added produced a finished product that was a 4-1-0-3 (N-P-K-S) fertilizer. The produced slurry was thicker than that produced in Example IV but could still be pumped and sprayed with adjutation in the tank.

The slurry processing method set out above has an added advantage of destroying all organisms in the sludge including harmful pathogens by the drastic lowering of the mix pH, thereby eliminating any problems in farm application that could be associated with such pathogens.

The practice of the process, as shown, has provided a fertilizer suitable for a particular crop and soil. Whereas, when test runs were made that followed the teachings of the cited U.S. Pat. No. 3,050,383, the product manufactured therefrom had a whitish residue on the surface of the particles, in addition to a high dust content. Also, the product produced was not tailored to a particular soil or crop, and the material nutrients remained unbonded, had an appearance similar to those found in regular soluble salt fertilizers, and would therefore readily dissolve and be rapidly leached when placed in the soil.

The present process essentially duplicates the natural processes as would occur over time to produce humic acid fertilizers where there is present in the humic pack the particular inorganic elements. It accomplishes this process in a very short period of time by hydrolyzing the inorganic and organic constituents together via a drastic pH change. Where earlier processes have been concerned with final pH, none have arrived at that pH by any procedure like that of the present process that duplicates the natural occurrences of nature to produce the humic acid fertilizer tailored to a type of crop and soil.

It should be understood that the invention may be embodied in other specific forms without departing from a spirit or essential characteristics. The described procedures in practicing the invention are to be considered in all respects as illustrative only and not restrictive, and the scope of the invention, is therefore, indicated by the appended claims rather than by the foregoing description. Therefore, any change to the subject of described processes which come within the meaning and within the range of equivalency and the appended claims should be understood are to be embraced within their scope.

I claim:

1. A method for producing humic acid fertilizer, comprising the steps of
   (a) selecting at least one organic material from the group of low humic acid materials including livestock and poultry manure, sewage sludge, separated garbage, cotton gin trash, fruit cannery wastes, vegetable cannery wastes, nut cannery wastes, wood and paper pulp wastes, spent mushroom compost, methane and alcohol solid wastes, lignite, leonardite, humate, and coal, said organic material being at least 30% by dry weight of the finished product for dry granular production and 10–25% by dry weight of the finished product for slurry production;

(b) analyzing said organic material to determine the composition of major inorganic elements of nitrogen, phosphate, potash, and sulfur;

(c) mixing trace amounts up to 1% by weight of said major elements with said organic material to produce a specific formula combination of said major elements in the finished fertilizer product;

(d) adding a measured quantity of water to the mixture of organic material and major elements to produce a moisture content of 12–30% by weight;

(e) depositing the mixture in a reactor and sealing said reactor to the atmosphere;

(f) blending with the mixture within said reactor to measured quantity of an acid material having a first pH level to drastically change the pH of the mixture, thereby resulting in hydrolization of the mixture and an increase in temperature and pressure within said reactor, said quantity of acid material being 15–30% by weight of a finished granular product and 5–15% by weight of a finished slurry product;

(g) blending a measured quantity of a base material having a second pH level opposite said first pH level with said mixture within said reactor to adjust the pH level of the mixture to that of the final fertilizer, said quantity of base material being 4–10% by weight of a finished granular product and 2–8% by weight of a finished slurry product;

(h) maintaining a pressure of up to 30 psi and a pressure of up to 280° F. within said reactor to assist in hydrolysis of the mixture to form within the mixture a new molecular structure including molecular clusters of inorganic chemicals that surround larger humic acid molecules; and (i) processing the finished fertilizer mixture to a desired consistency.

2. A method as defined in claim 1 and further comprising the step of preconditioning the organic material to obtain a particle size of up to one quarter (¼) inch prior to adding said major inorganic elements.

3. A method as defined in claim 2, and further comprising the step of adding plant nutrients and minerals to the mixture prior to depositing the mixture into said reactor.

4. A method as defined in claim 3, wherein the reaction of the first material to the mixture proceeds to a temperature of between 100° and 200° F. prior to introducing the second material thereto.

5. A method as defined in claim 4, and further comprising the step of granulating the finished fertilizer to a desired particle size.

6. A method as defined in claim 3, wherein the quantity of water added to the mixture is sufficient to produce a pumpable slurry.

7. A method for producing humic acid fertilizer, comprising the steps of (a) selecting at least one organic material from the group of low humic acid materials including livestock and poultry manure, sewage sludge, separated garbage, cotton gin trash, fruit cannery wastes, vegetable cannery wastes, nut cannery wastes, wood and paper pulp wastes, spent mushroom compost, methane and alcohol solid wastes, lignite, leonardite, humate, and coal, said organic material being at least 30% by dry weight of the finished product for dry granular production and 10–25% by dry weight of the finished product for slurry production and having a high content of one of lignin and cellulose;

(b) analyzing said organic material to determine the composition of major inorganic elements of nitrogen, phosphate, potash, and sulfur, (c) mixing trace amounts up to 1% by weight of said major elements with said organic material to produce a specific formula combination of said major elements in the finished fertilizer product;

(d) adding a measured quantity of water to the mixture of organic material and major elements to produce a moisture content of 12–30% by weight;

(e) depositing the mixture in a reactor and sealing said reactor to the atmosphere;

(f) blending with the mixture within said reactor a measured quantity of a base material having a first pH level to drastically change the pH of the mixture, thereby resulting in hydrolization of the mixture and an increase in temperature and pressure within said reactor;

(g) blending a measured quantity of an acid material having a second pH level opposite said first pH level with said mixture within said reactor to adjust the pH level of the mixture to that of the final fertilizer;

(h) maintaining a pressure of up to 30 psi and a pressure of up to 280° F. within said reactor to assist in hydrolysis of the mixture to form within the mixture a new molecular structure including molecular clusters of inorganic chemicals that surround larger humic acid molecules; and (i) processing the finished fertilizer mixture to a desired consistency.

* * * * *